Dec. 19 1922.
E. PREHN.
VEHICLE RUNNING BOARD BRACE,
FILED SEPT. 10. 1921.
1,439,481
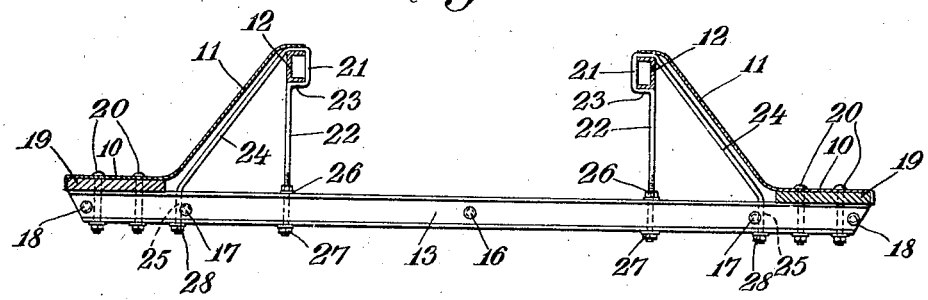
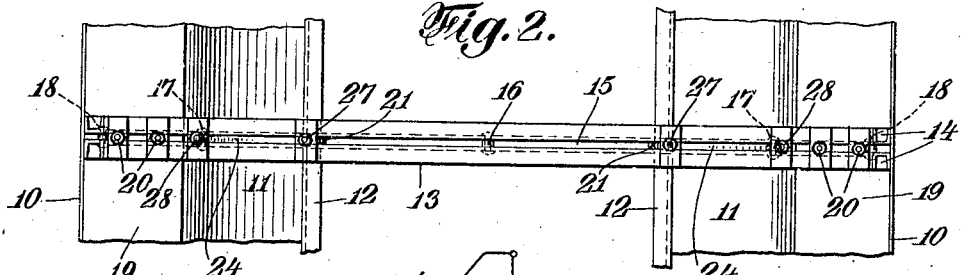
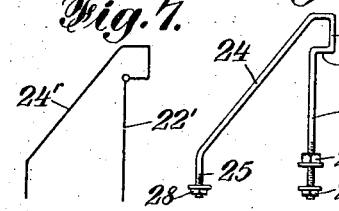
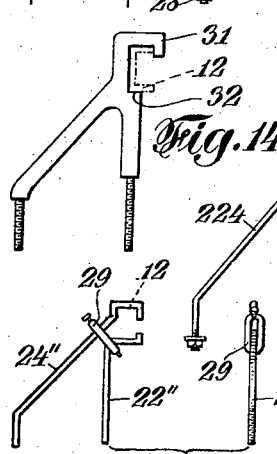
Inventor
Ernest Prehn.
By his Attorney Patented Dec. 19, 1922.

1,439,481

UNITED STATES PATENT OFFICE.

ERNEST PREHN, OF NEWARK, NEW JERSEY.

VEHICLE RUNNING-BOARD BRACE.

Application filed September 10, 1921. Serial No. 499,736.

*To all whom it may concern:*

Be it known that I, ERNEST PREHN, citizen of the United States, and resident of 724 Hunterdon St., Newark, in the county of Essex and State of New Jersey, have invented certain new and useful Improvements in Vehicle Running-Board Braces, of which the following is a specification.

This invention relates to a new article of manufacture for use in connection with the running boards of vehicles.

One of its objects is to provide a cantalever truss arrangement by means of which not only the running boards of a vehicle may be advantageously reinforced, but whereby also the chassis frame is reinforced and rigidly held against transverse deflections, said means thus performing the function of a reinforcing and stabilizing chassis cross member.

Another object of my invention is to provide means whereby the flanges of each of the usual channel-shaped chassis frame members are substantially clamped together individually, which clamping function increases by tightening said truss arrangement in the direction toward the chassis frame.

Another object of my invention is to provide in combination with such cross member, running board supporting means whereby the running boards are not only supported but also efficiently prevented from sagging when pressure is exerted upon them.

Other objects of my invention are to provide within such a device a bar member suspended in cantalever fashion adapted to engage the lower face of the running boards of a vehicle, and suspending means comprising in parts a stay, brace, or compression portion adapted to be permanently set between and positively space the vehicle frame and the bar member and engage the latter at desired points below said vehicle frame, and an arm, bracket, or tension portion adapted to engage the ends of the bar member, a connecting member between said compression and tension portions adapted to embrace and tighten together the channel flanges of the vehicle frame, said bracket portions being so arranged as to permit their adjustment and thus the adjustment of the center and the ends of the bar member, the latter in substantially upward direction relative to the vehicle frame and the running boards, while using as pivotal points the permanent points of attachment of aforesaid compression portions to said bar member.

The foregoing and further objects will be more fully apparent from the following description and the accompanying drawing, forming a part of this specification and in which:—

Fig. 1 illustrates a side elevation of a preferred form of my device shown attached to the chassis frame of a vehicle.

Fig. 2 illustrates a bottom view thereof.

Figs. 3, 4, 5, 6, 7, 8, 9, 10, 11, 12, 13 and 14 represent various possible designs of my suspending member.

Referring to the first two figures, numeral 10 represents the running boards of a vehicle, be it an automobile, a truck, or the like. Numeral 11 denotes the braces or suspensions attached to the running boards, and usually disposed between the mud guards, not shown, of a vehicle. The vehicle structure of the frame is represented by channels 12, to which braces 11 are usually attached.

Disposed below the vehicle frame and passing under the running boards 10 is a bar member indicated at 13, comprising two channel members 14 spaced at 15 and securely held together by spacers and rivets indicated at 16, 17, and 18. Directly below the running boards, I preferably provide wooden blocks 19 so arranged as to be capable of attachment by means of bolts 20 passing through the running boards 10, blocks 19 and through the space 15 between channels 14.

The heads of the bolts are disposed preferably at the upper surface of the running boards 11, while they are secured by means of washers and nuts at the lower flanges of channels 14.

Associated with the vehicle structure or frame, indicated at 12, are suspension means 21 comprising a substantially vertically disposed brace, stay or spacing portion 22, which bears with its bend 23 against the lower flange of channel frame 12.

The other leg or arm portion 24 of my suspension means is disposed at angular relation to the stay portion 22, and passes around the upper flange of channel frame 12.

From the foregoing it will be evident that the suspension means 21 completely embrace with their upper portions both flanges of channel frame 12, so that when arm 24 is tightened the channel flanges are squeezed against each other. Thus a positive grip is exerted upon both frame members 12.

The lower end 25 of the arm or tightening member is bent substantially parallel with brace portion 22 and is provided with a thread adapted to be engaged by a nut bearing against the lower flanges of bar members 14. Also the lower portion of stay 22 is threaded and adapted to receive a nut disposed at the upper flanges of bar members 14 and another nut bearing against the lower faces of bar member 14.

From the drawing, it will be seen that the bent-down portions 25 of arms 24 bear against rivets 17, the purpose of which will be explained presently.

When my device is being attached to a vehicle the suspension means 21 are first secured at a desired point of the vehicle frame or structure so that the stay rods or brace portions 22 bear against the vehicle structure while arms 24 are suspended thereby. Then the upper nuts 26 of the stay rods are brought to a height corresponding substantially to that of the running boards. Now the bar member 13 is placed below the running boards in transverse relation to the vehicle so that the lower ends 25 of arms 24 and the threaded ends of stays 22 pass through the spaces between channel members 14.

Then the lower nuts 27 of the stay rod 22 are attached. In this manner bar member 13 is temporarily suspended. Now the height of the bar member is adjusted by manipulating the nuts 26 and 27 so that blocks 19 abut with the lower faces of the running boards. When thus adjusted bolts 20 are passed through the running boards, blocks, and through the space between channel members 14, and are tightened in place.

Great care must be taken that the lower bent extensions 25 of arms 24 are disposed without the rivets 17. Now the adjustment or tightening of the bar ends may proceed by securing to the lower bent end 25 of arms 24, the respective nuts 28. As may be surmised from the above manner of suspension, stay rods 22 bearing against the lower face of the vehicle frame form in substance a spacer between the vehicle frame and the bar member 13.

The points of attachment of the bar members and braces 22 between the nuts 26 and 27, form substantially pivotal points of this cantalever construction. Now when nuts 28 of arms 24 are tightened, the ends of the bar members 13 are drawn in upward direction, while the center portion of the bar member 13 is bent in downward direction, the point of attachment of bar member 13 between nuts 26 and 27 serving as a pivot.

Emphasis is laid upon the fact that the lower bent portion 25 of arms 24 are substantially vertical and at perpendicular relation to channel member 13. Furthermore these portions 25 are prevented from moving toward each other by means of spacers and rivets 17 which so to speak roll upon the unthreaded portion of bends 25 in upward direction when nuts 28 are tightened, thereby causing the ends of member 13 to bend upwards.

In this manner a rigid and adjustable support for the running boards is attained, so that sagging of the running boards, when pressure is applied, is eliminated. When during the use and operation of the vehicle or through any other cause, the running boards tend to in any manner descend from their original position, they may be elevated by simply tightening nuts 28 to the desired degree.

However, this construction, in addition to serving as running board support, causes also the clinching together of flanges of each individual chassis member and forms when tightened a rigid reinforcing cross piece and spacer for and between these chassis members, whereby the chassis frame is considerably reinforced. Their flanges are prevented from twisting and the members themselves are prevented from bodily dislocation or movement in relation to each other, or swaying when pressure is exerted upon the running board at one side of the vehicle, which is particularly evident in inexpensive chassis construction as used for instance in Ford cars.

The effect of a rigid reinforcing spacer or cross member disposed between the chassis members attained through my construction is made possible only through first the cantalever arrangement explained above, and secondly through the rigid attachment of the combination compression and tension member 21 to the chassis members, which latter are not only embraced by said combination member, but also caused to be increasingly tightened thereby with the increased drawing function of nut 28.

In other words such rigid reinforcing construction is only possible when the chassis members are held together by a cantalever brace arrangement which engages the chassis members in a positive fashion, in which the connection between the chassis frame and bar member forms a part of the structure, so that bar member 13 cannot accidently move toward the chassis frame, for instance, when the vehicle is subjected to excessive jars.

While I have shown in Figs. 1 and 5, a one-piece suspension member, be it understood that various other constructions similar to that shown, for instance, in Fig. 6 may be readily employed. Various other constructions of my suspension members become necessary due to the manifold structure of vehicles which in some cases would not permit, without great difficulty, to attach a one-piece suspension member from the vehicle frame.

Thus, I have devised a unit composed of two hinged parts and shaped in a similar manner as that shown in Fig. 5 when in operative position. In Figs. 7, 8, 9 and 10 are shown different modified forms where the stay portion 22' is hingedly connected to the brace or arm portion 24'. The disposition of the hinges connecting the two portions may vary as shown. In Fig. 11 there is illustrated a similar suspension member consisting of two separate pieces 22'' and 24'' held together by means of a clamp 29, so that the upper bent ends of the stay portion 22'' and the brace portion 24'' engage the frame channel 12. In Fig. 12, there is shown another construction where the upper part of stay member 122 is shaped in a hook form, as indicated at 30, which hook form is adapted to engage the frame channel 12.

Secured by any convenient means, as for instance, a rivet or bolt indicated at 31, the brace member 124 is attached to stay 122.

Similar in shape to that shown in Fig. 12, is a forging made of one piece and also consisting of a stay member 122' and a brace member 124', joined below the flange of channel 12 and engaging the latter's lower flange by means of a hook portion 30'.

In Fig. 14, is also shown a one-piece forged contrivance with a hoop portion on the top, as indicated at 31, and adapted to engage the upper flange of channel 12. The lower cut-out portion 32 engages the lower flange of channel 12.

In Figs. 3 and 4, other various modifications of my device are shown, where a continuous lower stay member 222 is shown adapted to engage the lower flange of channel 12. The suspension or brace member 224 is also made of one continuous piece adapted to be supported by the top flange of frame channel 12. In order to secure the two longitudinal members in their proper relation to each other and in the proper relation to the channels, various clamping means indicated at 29' may be employed, although these clamps are not necessary.

From the foregoing it will be evident that the principle of a combination cantalever support for running boards and a reinforcing cross or spacing member for the chassis frame may be solved in various ways. I therefore reserve for myself the right to make such changes and improvements as may be necessary to meet various conditions.

Having thus described my invention, I claim:—

1. In a combination chassis reinforcing means and running board support, a pair of bar members, a spacer between said bar members, the latter disposed transversely to the chassis frame of a vehicle and below its running boards, combination brace and suspension means adapted to connect the bar members with the chassis frame in a cantalever truss fashion and composed of a brace or compression portion adapted to positively space the body of said bar members from the chassis frame, a chassis frame embracing portion adapted to positively engage a chassis frame channel, and an adjustable suspension portion adapted to draw the ends of said bar members in upward direction, said brace and said suspension portions passing through the space between the bar members, and said suspension portion bearing against said spacer placed between said bar members.

2. A chassis brace and running board support for vehicles, comprising a pair of spaced bar members adapted to be disposed transversely to the chassis frame of a vehicle and below its running boards, a spacer disposed at the ends of and separating said bar members, suspension means adapted to be attached to and positively engage and embrace the chassis frame of the vehicle, and having a depending or compression portion and a suspension arm disposed angularly relative to said compression portion, the latter having a depending end, said end and said compression portion adapted to pass through the space between the bar members, said compression portion having at its lower ends means for adjusting the distance between the body of said bar members and the chassis frame of the vehicle, and a joining element between said compression portion and said suspension arm for positively embracing the chassis frame, said suspension arm adapted to adjust the ends of said bar members relative to the running boards and simultaneously positively engage and increasingly grip said chassis frame while bearing against said spacer between the bar members, thereby being prevented by said spacer from moving inwards.

Signed at New York in the county of New York and State of New York this 15th day of August A. D. 1921.

ERNEST PREHN.